United States Patent
Chen et al.

[11] Patent Number: 5,757,995
[45] Date of Patent: May 26, 1998

[54] OPTICAL COUPLER

[75] Inventors: Bao Xue Chen; Michiya Masuda, both of Yokohama, Japan

[73] Assignee: NHK Spring Co., Ltd., Yokohama, Japan

[21] Appl. No.: 742,407

[22] Filed: Nov. 4, 1996

[30] Foreign Application Priority Data

Dec. 27, 1995 [JP] Japan ................. 7-341311
May 21, 1996 [JP] Japan ................. 8-125857

[51] Int. Cl.$^6$ ........................... G02B 6/26
[52] U.S. Cl. .................. 385/45; 385/14; 385/43; 385/50; 385/132
[58] Field of Search ................... 385/45, 46, 24, 385/14, 129, 132, 50, 43

[56] References Cited

U.S. PATENT DOCUMENTS

| | | | |
|---|---|---|---|
| 4,737,002 | 4/1988 | Boucouvalas | 350/96.13 |
| 4,846,540 | 7/1989 | Kapon | 350/96.12 |
| 5,058,978 | 10/1991 | Kondoh et al. | 385/43 |
| 5,138,687 | 8/1992 | Horie et al. | 385/129 |
| 5,185,828 | 2/1993 | van der Tol | 385/28 |
| 5,546,483 | 8/1996 | Inoue et al. | 385/14 |

FOREIGN PATENT DOCUMENTS

| | | |
|---|---|---|
| 3-172804 | 7/1991 | Japan. |
| 3-245107 | 10/1991 | Japan. |
| 5-11130 | 1/1993 | Japan. |
| 5-119220 | 5/1993 | Japan. |

*Primary Examiner*—John Ngo
*Attorney, Agent, or Firm*—Frishauf, Holtz, Goodman, Langer & Chick

[57] ABSTRACT

A transition waveguide is provided between one main waveguide and two branching waveguides. The transition waveguide includes a stepped portion, of which the waveguide width suddenly slightly spreads stepwise with respect to the distal end portion of the main waveguide, and an extension portion extending from the stepped portion toward the branching waveguides. The waveguide width of the extension portion is substantially fixed or gradually increased in a region ranging from the stepped portion to the branching waveguides.

7 Claims, 5 Drawing Sheets

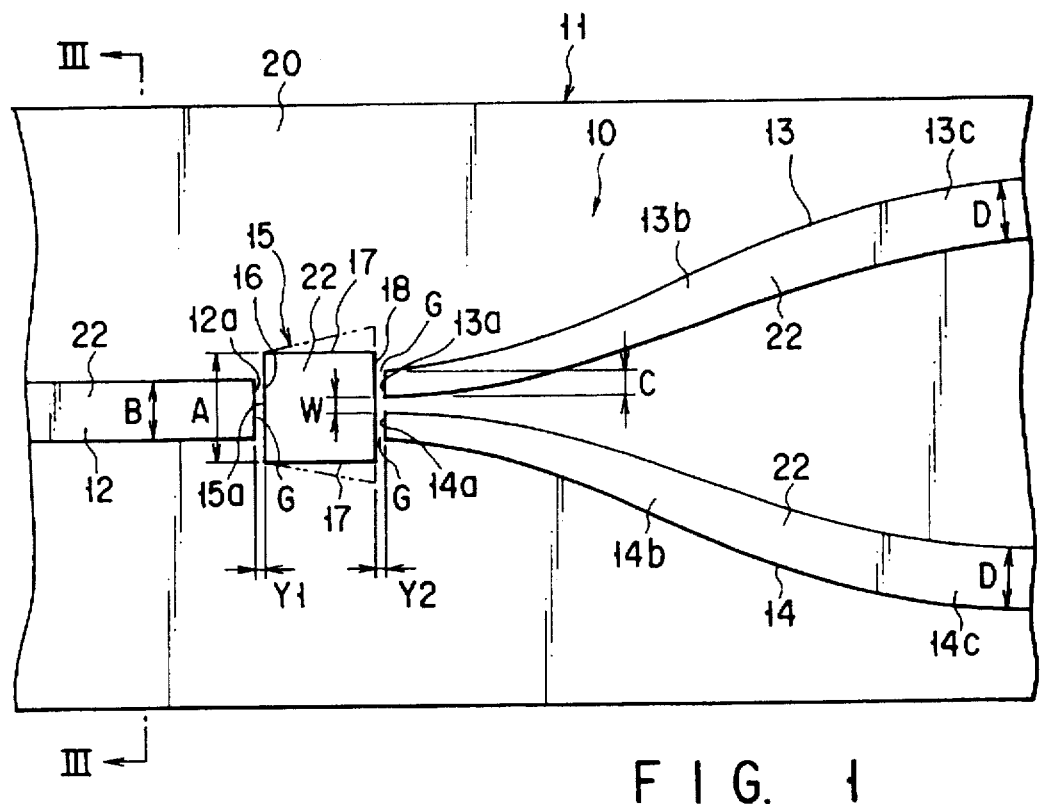
F I G. 1
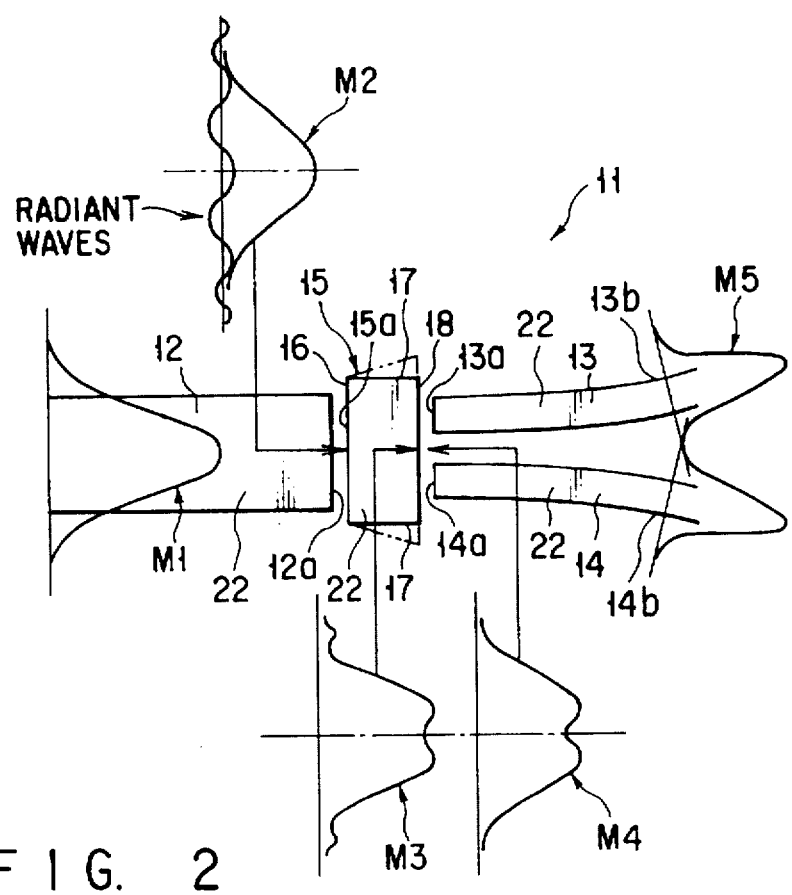
F I G. 2

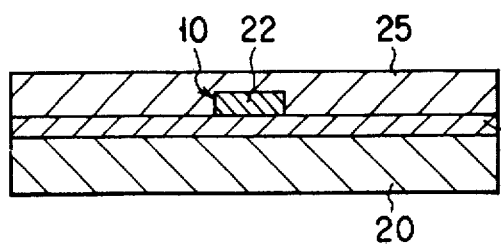
F I G. 3
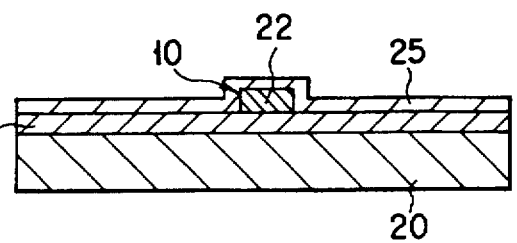
F I G. 4
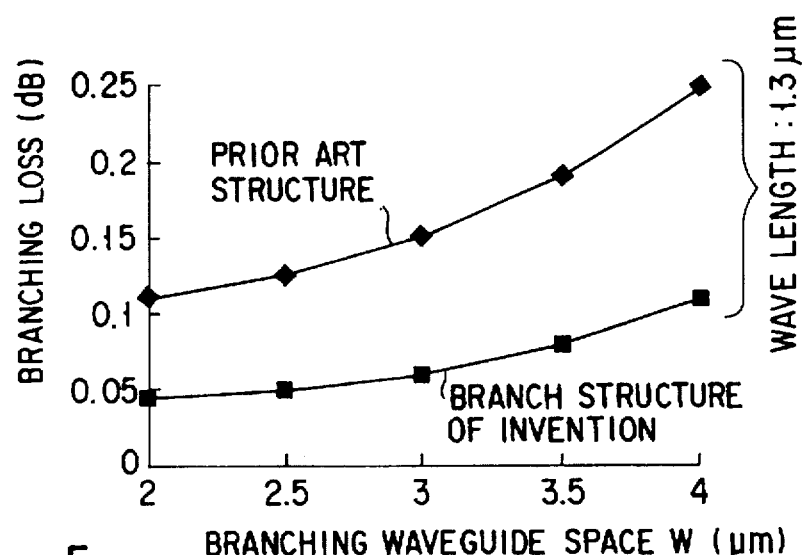
F I G. 5
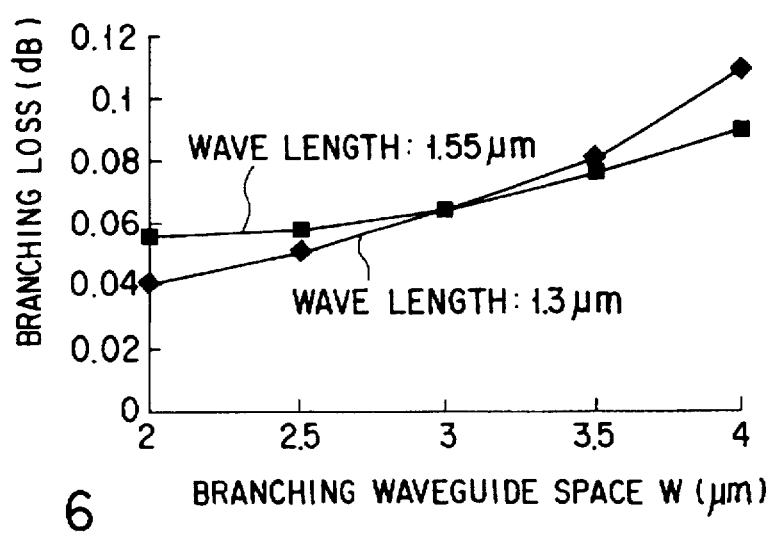
F I G. 6

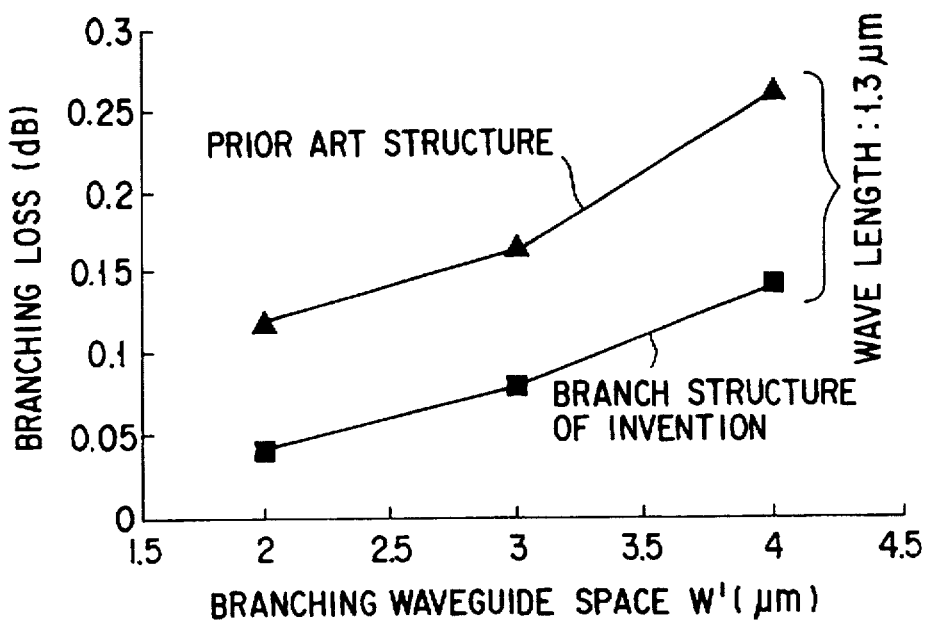
F I G. 9
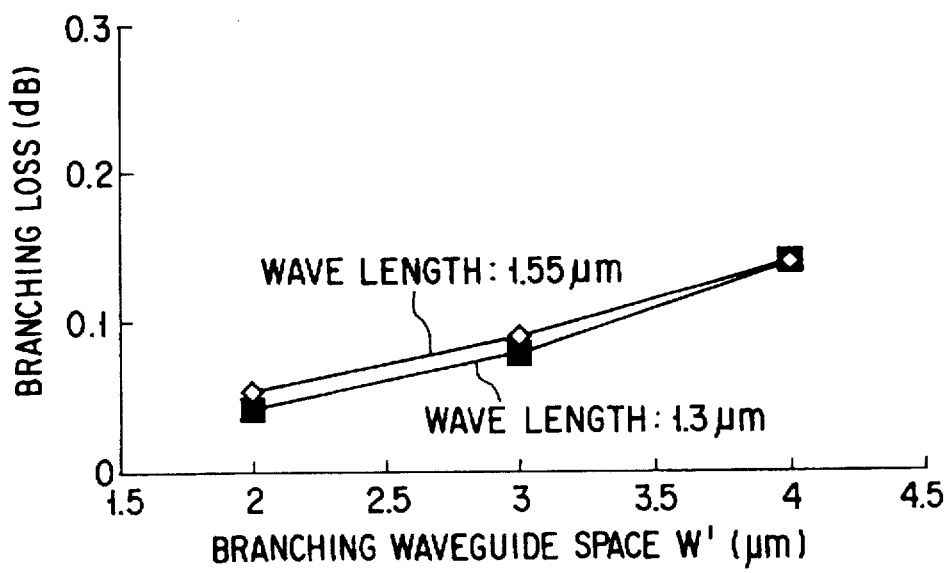
F I G. 10

OPTICAL COUPLER

BACKGROUND OF THE INVENTION

1. Field of the Invention

The present invention relates to an optical coupler applicable to devices for branching signal light in optical communication or the like.

2. Description of the Related Art

Optical directional couplers, such as those described in Jpn. Pat. Appln. KOKAI Publication Nos. 3-172804 and 5-119220, for example, are known as means for branching signal light in devices for optical integrated circuits used in optical communication or the like. Also known are Y-branch waveguides such as those disclosed in Jpn. Pat. Appln. KOKAI Publication Nos. 3-245107 and 5-11130.

In a conventional optical directional coupler, as shown in FIG. 11 of the present application, for example, parts of a plurality of waveguides 2, 3 and 4 formed on a substrate 1 are brought close to one another in parallel straight relation, whereby light propagating through the input-side waveguide 2 is transferred to the output-side waveguides 3 and 4. Since it has a fixed waveguide width, the optical directional coupler of this type has an advantage in that it can propagate a single-mode incident light without changing the mode, thus entailing low loss.

The optical directional coupler arranged in this manner is, however, depends highly on the wavelength of light, since its propagation constant is susceptible to changes of the wavelength. Accordingly, the wavelength bandwidth is as narrow as 50 to 100 angstroms, so that it is difficult to settle the spaces between the waveguides and the length of the junction. In other words, the optical characteristics will change greatly due to a variance in dimension at the time of manufacture.

Generally, light beams with the wavelengths of 1.3 μm and 1.55 μm are used in optical communication. In a branch structure based on an optical directional coupler, however, it is necessary to change the coupling length according to the wavelengths used. Accordingly, a plurality of types of optical directional couplers must be used depending on the wavelengths used, and this creates a critical problem related to the arrangement of a communication system.

In a Y-branch waveguide, as shown in FIG. 12 of the present application, on the other hand, a Y-shaped diverging portion 8 is provided between one input-side waveguide 5 and two output-side waveguides 6 and 7 on a substrate 1. The Y-branch waveguide of this type depends less on the wavelength of light, and its wavelength bandwidth is as wide as about 1,000 angstroms, so that it can be designed relatively easily.

Since the Y-branch waveguide includes a region 8' having a waveguide width which is greater than those of the waveguides 5, 6 and 7, however, it has a tendency toward multimodal behavior that is attributed to the development of higher-order modes at the diverging portion 8, even though the incident light is in the single mode. Thus, the Y-branch waveguide has a disadvantage that some of optical power is radiated outside the waveguide, resulting in higher loss. Another disadvantage is that an end 8a of the diverging portion 8 must be formed in a fine acute pattern or shape, and it is difficult to obtain a perfect acute pattern due to working restrictions and the like. If the shape of the end 8a of the diverging portion 8 is imperfect, branching loss is liable to be caused by scattered light beams.

It is known that the branching loss of the Y-branch waveguide is lowered in proportion to the width of the end 8a of the diverging portion 8. If the end 8a of the diverging portion 8 is sharp, however, a core in a buried waveguide may fail to be fully covered by a cladding layer, possibly causing local hollows. In addition, it is difficult to sharpen the end 8a of the diverging portion 8 fully and finely. Thus, in practically manufacturing the Y-branch waveguide, the end 8a of the diverging portion 8 cannot be shaped as designed, owing to working restrictions and the like, and a somewhat blunt portion 9 is inevitably formed, as indicated by two-dot chain line in FIG. 12 of the present application. Accordingly, a region 5' that has a greater waveguide width may be lengthened, so that desired properties may not be able to be obtained in some cases.

In order to solve these problems, it is advisable to secure a blunt width W' of 2 μm or more beforehand at the end 8a of the diverging portion 8 in designing the diverging portion. The blunt width W' of 2 μm or more should be secured also because it is necessary to work the end 8a of the diverging portion 8 accurately into a designed shape and to bury the core entirely in the cladding layer in manufacturing the buried waveguide. However, the presence of the blunt width W' results in an increase in mode-change loss at the diverging portion 8.

In a Y-branch waveguide having the blunt portion 9, as shown in FIG. 13 of the present application, most of the light beams propagating through the input-side waveguide 5 are fundamental mode components M1, since their field-distribution is subjected to a gentle perturbation. As the light beams advance, the field-distribution symmetrically spread out right and left. Since the diverging portion 8 is provided with the two symmetrical output-side waveguides 6 and 7, on the other hand, only an even mode is excited. More specifically, there is a substantial difference in field-distribution between a fundamental mode M1 of the light beams propagated through the input-side waveguide 5 and an even mode M' for the output-side waveguides 6 and 7 at the diverging portion 8. This difference causes a mode-change loss, which constitutes part of the branching loss. In this case, a specific radiation loss is at a value not smaller than about 0.1 dB (decibel). According to the existing waveguide manufacturing methods, some variation in the waveguide shape is unavoidable, and the core must be buried entirely in the cladding layer, so that the blunt width W' tends to increase.

SUMMARY OF THE INVENTION

Accordingly, an object of the present invention is to provide an optical coupler which is capable of reducing the influence of variation and which has the shape of a diverging portion and the like upon the waveguide properties, in a Y-branch structure that depends little on the wavelength.

Another object of the invention is to provide an optical coupler in which a branching waveguide space of 2 μm or more can be secured without entailing a substantial branching loss, in which a diverging portion can be easily worked owing to the wide waveguide space, and in which a core at the diverging portion can be fully covered by a cladding layer.

In order to achieve the above objects, an optical coupler according to the present invention comprises a main waveguide having a distal end portion and including a core and a cladding layer covering the core, a pair of branching waveguides each having a proximal end portion on an extension of the distal end portion of the main waveguide and each including a core and a cladding layer covering the core, and a transition waveguide provided between the distal end portion of the main waveguide and the respective proximal end portions of the pair of branching waveguides. The transition waveguide includes a core and a cladding layer covering the core and being formed having a stepped portion, spreading stepwise so that the waveguide width of the stepped portion increases from the distal end portion of the main waveguide, and an extension portion, extending from the stepped portion toward the branching waveguides.

Preferably, the core of the transition waveguide is separated from or integral with those of the main and branching waveguides.

The transition waveguide according to the invention includes the stepped portion, of which the waveguide width slightly increases stepwise with respect to the main waveguide, and the extension portion that extends from the stepped portion toward the branching waveguides. Although light propagating in the transition waveguide is mainly in a fundamental mode, there also exist scanty radiation-mode components that are excited at the incoming end of the transition waveguide. Since the radiation-modes exhibit propagation constants different from that of the fundamental mode, a field-distribution favorable to coupling with the pair of branching waveguides, i.e., a wave front that matches the even mode supported by the branching waveguides, can be created at the outgoing end of the transition waveguide by adjusting the length of the transition waveguide to an appropriate value and properly superimposing the respective field-distributions of the fundamentl mode and the radiation mode on each other. Although a slight mode-change loss is caused as the light switches from the main waveguide to the transition waveguide, the loss of the light transferred from the transition waveguide to the branching waveguide is low. Since Fresnel's reflection loss, which is believed to be caused between the main waveguide and the transition waveguide or between the transition waveguide and the branching waveguides, is at a practically negligible value, the loss at the diverging portion as a whole can be restricted to a low level. It is advisable to adjust each of the distances between the main waveguide and the transition waveguide and between the transition waveguide and each branching waveguide to 2 µm to 8 µm. If this distance or space is shorter than 2 µm, it is difficult to attain a desired accuracy by a conventional film forming method. If the distance is longer than 8 µm, the width of each emitted light beam is so great that mode fields should be mismatched.

According to the present invention, light can be propagated efficiently. Since the distance (branching waveguide space) between the respective proximal end portions of the pair of branching waveguides can be set within a wide allowable range for variation, moreover, the accuracy of the core shape, which may possibly vary during the formation of the core at the diverging portion, can be eased. For these reasons, the influence of variation in shape during manufacture upon the waveguide properties can be reduced, so that the manufacture is facilitated, the incidence of defectives is lowered, and therefore, the yield of production is improved considerably. Also, changes in wavelength, if any, have little effect on the light propagation characteristics. Since the curvature in the vicinity of the proximal end of the diverging portion can be made gentle, furthermore, bending loss can be lowered.

A star coupler including four or more branches can be formed by combining a plurality of optical couplers according to the present invention. Also in this case, loss at each diverging portion is so low that the resulting star coupler can enjoy excellent insertion loss characteristics. Further, the optical coupler of the invention is applicable to the formation of a waveguide-type optical switch, modulator, etc.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a plan view of an optical coupler according to a first embodiment of the present invention;

FIG. 2 is a diagram showing changes of the field-distribution of the optical coupler shown in FIG. 1;

FIG. 3 is a sectional view of a waveguide taken along line III—III of FIG. 1;

FIG. 4 is a sectional view showing a modification of the waveguide;

FIG. 5 is a diagram showing the relationship between the branching waveguide space and loss of the optical coupler shown in FIG. 1;

FIG. 6 is a diagram showing the relationship between the branching waveguide space and loss of the optical coupler shown in FIG. 1 with respect to two different wavelengths;

FIG. 9 is a diagram showing the relationship between the branching waveguide space and loss of the optical coupler shown in FIG. 7;

FIG. 10 is a diagram showing the relationship between the branching waveguide space and loss of the optical coupler shown in FIG. 7 with respect to the two different wavelengths;

DETAILED DESCRIPTION OF THE PREFERRED EMBODIMENTS

Figure 7:
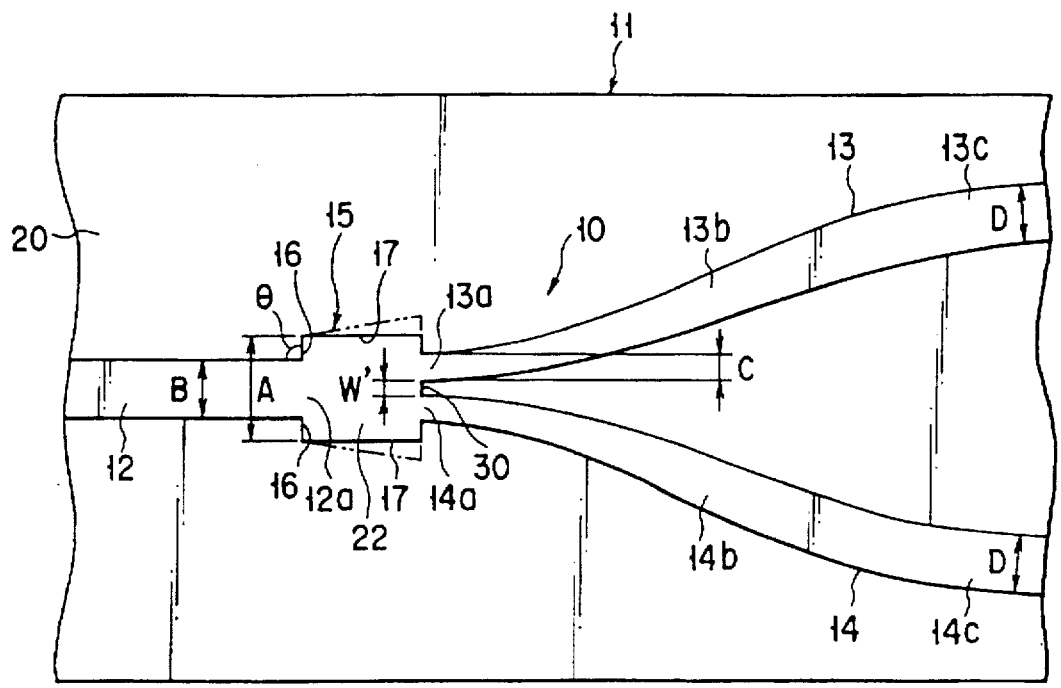
FIG. 7 is a plan view of an optical coupler according to a second embodiment of the invention.

A first embodiment of the present invention will now be described with reference to the accompanying drawings of FIGS. 1 to 6.

An optical coupler 11, which includes a Y-branch waveguide assembly 10, as shown in FIG. 1, comprises a main waveguide 12, two branching waveguides 13 and 14, and a transition waveguide 15 interposed between the main waveguide 12 and the branching waveguides 13 and 14. Proximal end portions 13a and 14a of the branching waveguides 13 and 14 are situated on an extension of a distal end portion 12a of the main waveguide 12. A separated portion G of a distance Y1 exists between a core 22 of the transition waveguide 15 and the distal end portion 12a of the main waveguide 12. Also, a separated portion G of a distance Y2 exists between the core 22 of the transition waveguide 15 and each of the respective proximal end portions 13a and 14a of the branching waveguides 13 and 14. Either of the distances Y1 and Y2 ranges from 2 μm to 8 μm (e.g., 5 μm).

The transition waveguide 15 is provided with a stepped portion 16 and an extension portion 17. The stepped portion 16 has a shape such the waveguide width of its region opposite the distal end portion 12a of the main waveguide 12 suddenly slightly spreads stepwise. The extension portion 17 extends from the stepped portion 16 toward the branching waveguides 13 and 14. The end face of the distal end portion 12a of the main waveguide 12 and one end face 15a of the transition waveguide 15 are parallel to or nearly parallel to each other. Also, the other end face 18 of the transition waveguide 15 and the end face of each of the respective proximal end portions 13a and 14a of the branching waveguides 13 and 14 are parallel to or nearly parallel to each other.

A waveguide width A of the stepped portion 16 is not greater than twice a width B of the main waveguide 12, for example. The waveguide width of the extension portion 17 is substantially fixed in a region ranging from the end face 15a on the side of the stepped portion 16 to the end face 18 on the side of the branching waveguides 13 and 14. As indicated by two-dot chain lines in FIG. 1, the extension portion 17 may be spread out so that its waveguide width increases toward the branching waveguides 13 and 14.

A waveguide width C of each of the respective proximal end portions 13a and 14a of the branching waveguides 13 and 14 is not greater than half the width B of the main waveguide 12. Besides, curved portions 13b and 14b that extend from the proximal end portions 13a and 14a toward the other ends are defined by circular arcs or curved lines based on trigonometric functions, such as sine curves. Each of the branching waveguides 13 and 14 has a shape such that its width gradually increases with distance from the proximal end portion 13a or 14a as it is connected to its corresponding portion 13c or 14c having a fixed waveguide width D. A distance (branching waveguide spade) W between the proximal end portions 13a and 14a is kept at 2 μm or more.

The following is a description of an example of a method for manufacturing the aforementioned optical coupler 11.

A low-refraction lower cladding layer 21, which consists mainly of $SiO_2$, is formed on the surface of a substrate 20 (shown in FIG. 3) composed of an Si wafer or quartz by a film forming method, such as the CVD (chemical vapor deposition) method or FHD (flame hydrolysis deposition) method. Further, a core 22, which has a refractive index about 0.2% to 0.32% higher than that of the lower cladding layer 21, is formed on the layer 21 by, for example, adding a dope to $SiO_2$. Alternatively, the refractive index of the cladding layer 21 may be lowered by loading the layer 21 with a dope that has a function to lower the refractive index.

After a predetermined waveguide pattern of a photoresist is formed on the surface of the core 22, it is etched by the RIE (reactive ion etching) method or the like, whereupon the waveguide core 22 with the predetermined pattern is obtained. Thereafter, an upper cladding layer 25 is formed by the CVD or FHD method so that the core 22 is buried therein. In this manner, the waveguide assembly 10 with a refractive index distribution of a step-index type is formed. FIG. 3 shows a buried waveguide formed by the FHD method. Alternatively, however, a ridge-type waveguide, such as the one shown in FIG. 4, may be formed by the CVD method.

Further, a waveguide with a grated refractive index distribution may be formed by a waveguide manufacturing method in which a dope added previously to increase the refractive index of the core 22 is thermally diffused by heating. Alternatively, a waveguide with a refractive index distribution of a grated-index type may be formed by the conventional waveguide manufacturing process (in which impurities are diffused into a glass substrate, for example) different from the above-described method.

In the optical coupler 11 including the waveguide assembly 10 according to the embodiment described above, light propagating through the interface between the main waveguide 12 and the transition waveguide 15 is mainly in a fundamental mode. Since the stepped portion 16 suddenly slightly spreads stepwise with respect to the main waveguide 12, however, scanty radiation-mode components can be excited in the waveguide 15. If the length of the transition waveguide 15 is adjusted to an appropriate value and that the respective field-distributions of the fundamental mode and the radiation mode are properly superposed on each other, moreover, mode-change losses are hardly caused at the interfaces between the transition waveguide 15 and the branching waveguides 13 and 14. Fresnel's reflection loss, which is believed to be caused when light is transferred from the main waveguide 12 to the transition waveguide 15 or from the transition waveguide 15 to the branching waveguides 13 and 14, is at a practically negligible value in the $10^{-6}$ order compared to 1 for input light, according to calculation based on geometrical optics. Even if slight mode-change losses are caused at the aforesaid individual interfaces, therefore, the loss of the optical coupler as a whole can be restricted to a low level.

FIG. 2 shows individual mode-coupling states for the field-distribution according to the foregoing embodiment. At the interface between the main waveguide 12 and the transition waveguide 15, a few radiation modes may be excited as the fundamental mode is changed from M1 to M2 because the width of the main waveguide is different from that of the transition waveguide. A field-distribution M3, which matches the even mode M4 supported by the branching waveguides located in 13a and 14a, can be formed by properly superimposing the fundamental mode on the radiation modes at the output side end face 18 of the transition waveguide 15. Thus efficient mode coupling with the even mode M4 can be effected at the respective proximal end portions 13a and 14a of the waveguides 13 and 14. In other hand, field-distribution of the even mode M4 can be adjusted to preferably matches the field-distribution M3 by reducing the waveguide width of each of the proximal end portions 13a and 14a of the two branching waveguides 13 and 14 to half the core width of the main waveguide 12 or less. Thus, the losses attributable to the mode change can be lessened furthermore.

In the optical coupler 11 described above, the distances Y1 and Y2 between the main waveguide 12 and the transition waveguide 15 and between the waveguide 15 and each of the respective proximal end portions 13a and 14a of the branching waveguides 13 and 14 are set within the range from 2 μm to 8 μm. Despite the separated configuration involving these spaces Y1 and Y2, reflection losses in these regions are substantially negligible, and no substantial drastic mode change is caused there, so that losses are too low to arouse problems. Also, bending loss can be restricted to 0.001 dB or less by selecting an appropriate shape, such as one defined by circular arcs or curved lines based on trigonometric functions, for the portions 13b and 14b that are continuous with the proximal end portions 13a and 14a of the branching waveguides 13 and 14, respectively.

According to the optical coupler of the embodiment described above, the mode-change losses can be lessened without providing the core 22 with any acute portion with a width of 2 μm or less. Accordingly, there is no need to form any fine acute portion, so that work is easy. Since the core 22 has no acute portion narrower than 2 μm, moreover, it can be enclosed by and buried entire in the upper cladding layer 25. In this manner, one of causes of molding defects at the diverging portion can be removed, so that the diverging portion can be molded with an improved yield. Thus, the waveguide assembly 10 obtained is subject to narrower variations in properties.

In order to ascertain the behavior (insertion loss, etc.) of the waveguide assembly 10 according the foregoing embodiment, the inventors hereof tried a simulation based on the BPM (beam propagation method). The following is a description of the result of the test. First, in the case of the foregoing embodiment, the branching loss is so low as about 0.04 dB with the branching waveguide space W at 2 μm or thereabout, as shown in FIG. 5. While the branching loss tends to increase as the branching waveguide space W widens, its increase according to the foregoing embodiment is slower than in the case of the conventional Y-branch structure. Even though the branching waveguide space W is widened to about 3.5 μm, moreover, the branching loss is restricted to 0.1 dB or less, which is much lower than that of the prior art Y-branch structure.

Figure 12:
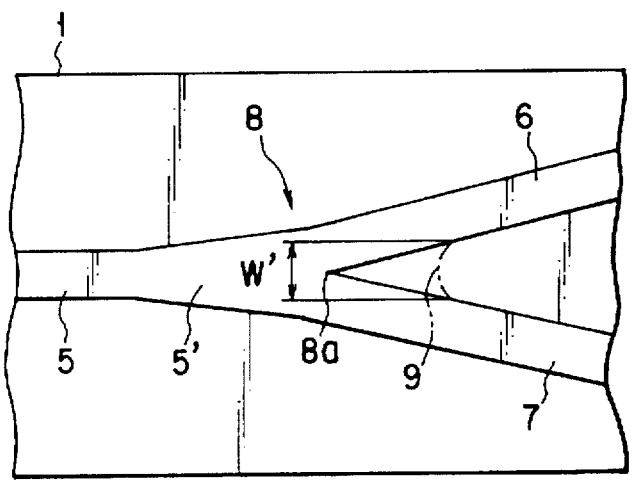
FIG. 12 is a plan view showing a conventional Y-branch waveguide.
Figure 13:
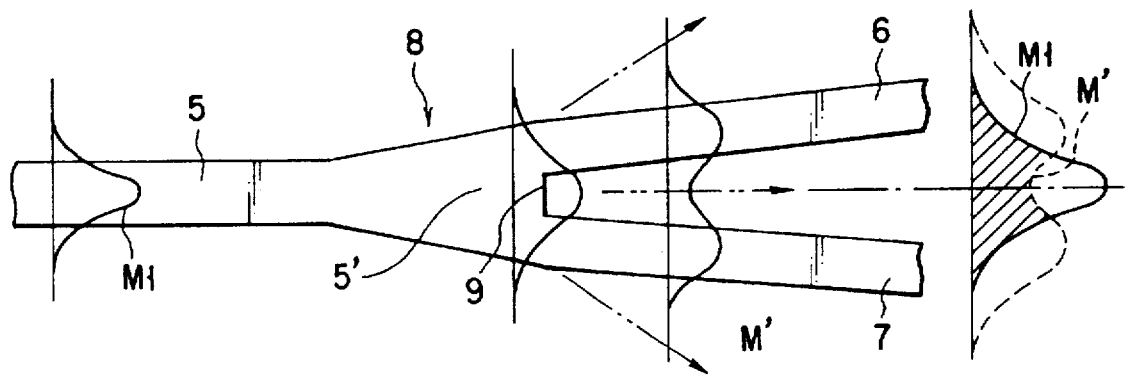
FIG. 13 is a diagram showing changes of the field-distribution of the Y-branch waveguide shown in FIG. 12.

In contrast with this, the loss of the conventional Y-branch waveguide (see FIG. 12) is 0.1 dB or more even though the diverging portion 8 is made sharp enough to keep the branching waveguide space (blunt width) W' at 2 μm. Also, the branching loss of the conventional Y-branch waveguide tends to increase drastically as the branching waveguide space widens.

Generally, light beams with the wavelengths of 1.3 μm and 1.55 μm are used in optical communication. Since the branching loss of the optical coupler 11 according to the foregoing embodiment depends little on the wavelength, as shown in FIG. 6, the branching loss obtained can be low enough with use of either of these two wavelengths. In the case where the core 22 of the transition waveguide 15 is separated from the respective cores 22 of the main waveguide 12 and the branching waveguides 13 and 14, as in the case of the foregoing embodiment, the core can be easily enclosed by cladding glass in a film forming process, and therefore, can be prevented from failing to be buried satisfactorily.

Referring now to FIGS. 7 to 10, a second embodiment of the present invention will be described.

An optical coupler 11 shown in FIG. 7 also comprises a main waveguide 12, a pair of branching waveguides 13 and 14, and a transition waveguide 15. The transition waveguide 15 is formed between a distal end portion 12a of the main waveguide 12 and the branching waveguides 13 and 14. The waveguide 15 is provided with a stepped portion 16 and an extension portion 17. The waveguide width of the stepped portion 16 suddenly slightly spreads stepwise from the distal end portion 12a of the main waveguide 12. The extension portion 17 extends from the stepped portion 16 toward the branching waveguides 13 and 14. An angle θ at which the stepped portion 16 is inclined to the longitudinal axis of the main waveguide 12 is 90° or nearly 90°.

A waveguide width A of the stepped portion 16 is not greater than twice a width B of the main waveguide 12, for example. The waveguide width of the extension portion 17 is substantially fixed in a region ranging from the stepped portion 16 to the branching waveguides 13 and 14. As indicated by two-dot chain lines in FIG. 7, the extension portion 17 may be spread out so that its waveguide width increases toward the branching waveguides 13 and 14.

A waveguide width C of each of proximal end portions 13a and 14a of the branching waveguides 13 and 14 is not greater than half the width B of the main waveguide 12. Besides, curved portions 13b and 14b that are continuous with the proximal end portions 13a and 14a, respectively, are defined by circular arcs or curved lines based on trigonometric functions, such as sine curves. An end 30 at the diverging portion is not sharp in shape, and ensures the branching waveguide space W' of 2 μm or more.

Also in the optical coupler 11 according to the second embodiment described above, the stepped portion 16 suddenly slightly spreads stepwise from the main waveguide 12, so that scanty radiation-mode components can be excited in the transition waveguide 15. If the length of the waveguide 15 is adjusted to an appropriate value such that the respective field-distributions of the fundamental mode and the radiation mode can be properly superposed on each other, moreover, losses are hardly caused at the interfaces between the transition waveguide 15 and the branching waveguides 13 and 14.

Figure 8:
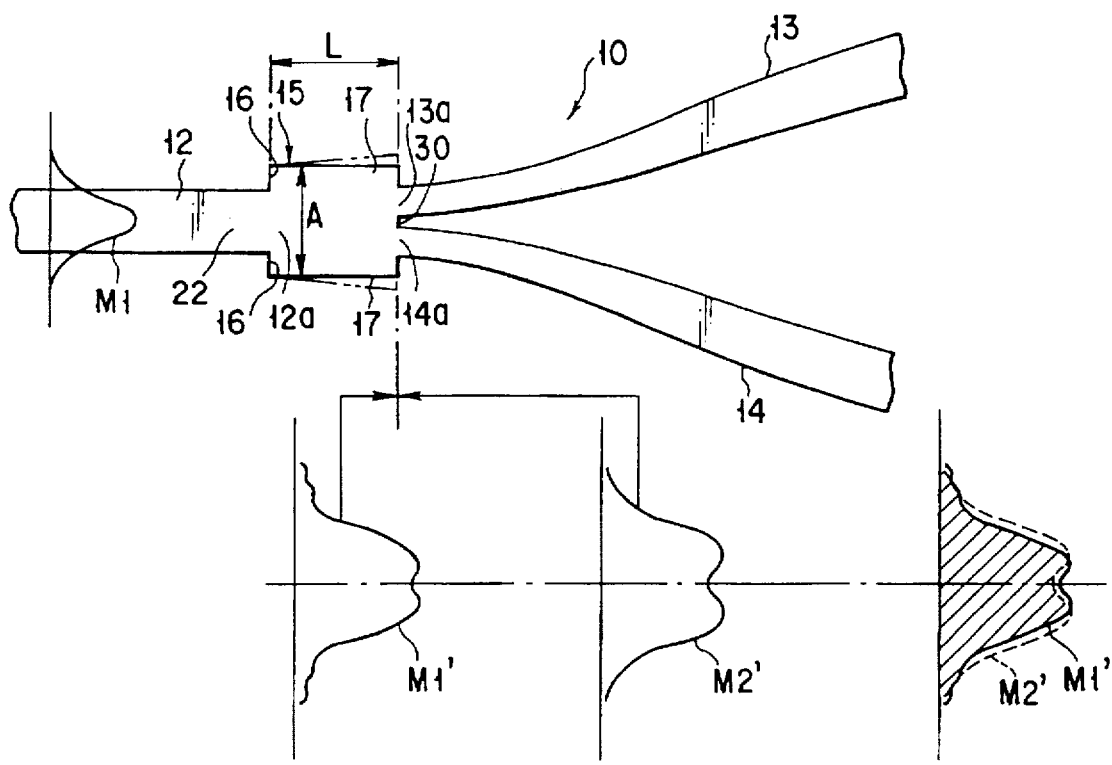
FIG. 8 is a diagram showing changes of the field-distribution of the optical coupler shown in FIG. 7.
Figure 11:
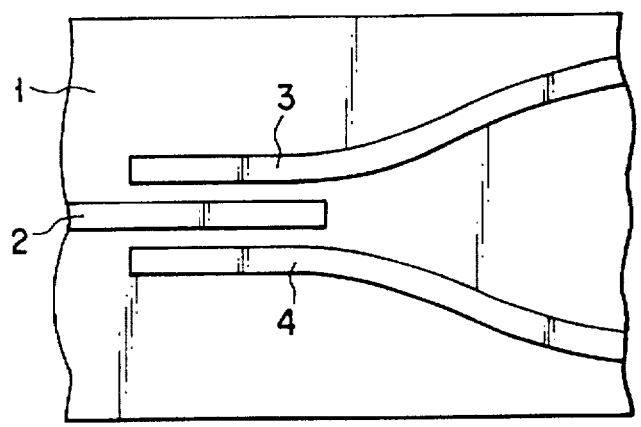
FIG. 11 is a plan view showing a conventional optical directional coupler.

FIG. 8 shows individual mode-coupling states for the field-distribution according to the second embodiment.

The light wave that propagates from the main waveguide 12 to the transition waveguide 15 is changed from the fundamental mode M1 to a fundamental mode supported by the transition waveguide 15 and a few radiation modes at the interface between the main waveguide 12 and the transition waveguide 15. The field M1' is formed by superimposing the fundamental mode on the radiation modes at the interface between the transition waveguide 15 and the branching waveguides 13 and 14. The distribution of the field M1' can be adjusted to matches that of the even mode M2' of the end portions 13a and 14a of the branching waveguides as well as possible by use of the adjustment of width A and length L of the transition waveguide 15. Thus, the smooth mode coupling with lower loss between the modes M1 and M2' can be effected. Moreover, for obtaining the efficient mode coupling mentioned above, it is necessary that the waveguide width of each of the proximal end portions 13a and 14a is not greater than half the core width of the main waveguide 12. Also in this optical coupler 11, the branching waveguide space W' is adjusted to 2 μm or more.

In order to ascertain the behavior (insertion loss, etc.) of the optical coupler 11 according the second embodiment described above, the inventors hereof tried a simulation based on the BPM (beam propagation method). The following is a description of the result of the test. First, the branching loss is so low as about 0.04 dB with the branching waveguide space W' at 2 μm or thereabout, as shown in FIG. 9. While the branching loss tends to increase as the branching waveguide space W' widens, its increase according to the second embodiment is slower than in the case of the conventional Y-branch structure. Even though the branching waveguide space W' is widened to about 3 μm, moreover, the branching loss is restricted to 0.1 dB or less, which is much lower than that of the prior art Y-branch structure. Since the branching loss of the optical coupler 11 according to the second embodiment depends little on the wavelength, as shown in FIG. 10, furthermore, the branching loss obtained can be low enough with use of either of the aforesaid two wavelengths (1.3 μm and 1.55 μm).

According to the first and second embodiments, as described herein, the accuracy of the core shape at the diverging portion can be eased, so that losses attributable to variation in the core shape can be lowered. Since a wide allowable range can be provided for the branching waveguide space, moreover, work is easy, and the yield of production of the diverging portion can be improved by a large margin. Since the waveguide width of the proximal end portion of each branching waveguide is not greater than half the width of the main waveguide, furthermore, losses attributable to the mode change at the junction between the transition waveguide and the branching waveguides can be further lowered.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A Y-branched optical coupler comprising:
   a main waveguide having a distal end portion and including a core and a cladding layer covering the core;
   a pair of branching waveguides each having a proximal end portion on an extension of the distal end portion of the main waveguide and each including a core and a cladding layer covering the core; and
   a transition waveguide provided between the distal end portion of the main waveguide and the respective proximal end portions of the pair of branching waveguides, said transition waveguide also including a core and a cladding layer covering the core and having a stepped portion and an extension portion, said stepped portion spreading stepwise so that a waveguide width of the stepped portion increases from the distal end portion of the main waveguide, and said extension portion extending from the stepped portion toward the branching waveguides;
   wherein a distance between the respective proximal end portions of the pair of branching waveguides is at least 2 μm.

2. The Y-branched optical coupler according to claim 1 wherein a waveguide width of the extension portion is substantially fixed in a region ranging from the stepped portion to the pair of branching waveguides.

3. The Y-branched optical coupler according to claim 1 wherein the extension portion is spread out so that a waveguide width thereof increases from an extension portion side toward the pair of branching waveguides.

4. The Y-branched optical coupler according to claim 1 wherein a width of each of the respective proximal end portions of the pair of branching waveguides is not greater than half a width of the main waveguide, and portions extending from the respective proximal end portions of the pair of branching waveguides are defined by circular arcs or curved lines based on trigonometric functions, wherein a width of each of the pair of branching waveguides gradually increases with distance from the proximal end portions.

5. The Y-branched optical coupler according to claim 1 wherein the core of the transition waveguide is separated from the respective cores of the main waveguide and the pair of branching waveguides.

6. The Y-branched optical coupler according to claim 5 wherein a distance between the core of the main waveguide and the core of the transition waveguide and a distance between the core of the transition waveguide and each of the respective cores of the pair of branching waveguides both range from 2 μm to 8 μm.

7. The Y-branched optical coupler according to claim 1 wherein the respective cores of the main waveguide, the transition waveguide, and the pair of branching waveguides are integral and continuous with one another.

* * * * *